United States Patent
Irrgang et al.

(10) Patent No.: US 12,259,261 B2
(45) Date of Patent: Mar. 25, 2025

(54) INDUCTIVE POSITION SENSOR

(71) Applicant: HELLA GmbH & Co. KGaA, Lippstadt (DE)

(72) Inventors: Marcus Irrgang, Luenen (DE); Johannes Nordhorn, Herzebrock-Clarholz (DE); Marc Seiffert, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 130 days.

(21) Appl. No.: 18/074,001

(22) Filed: Dec. 2, 2022

(65) Prior Publication Data

US 2023/0101886 A1  Mar. 30, 2023

Related U.S. Application Data

(63) Continuation of application No. PCT/EP2021/063902, filed on May 25, 2021.

(30) Foreign Application Priority Data

Jun. 4, 2020  (DE) ...................... 10 2020 114 861.5

(51) Int. Cl.
*G01D 5/20* (2006.01)
*B22D 11/10* (2006.01)
*B22D 41/50* (2006.01)

(52) U.S. Cl.
CPC ........... *G01D 5/2053* (2013.01); *B22D 11/10* (2013.01); *B22D 41/50* (2013.01)

(58) Field of Classification Search
CPC ....... G01D 5/2053; B22D 11/10; B22D 41/50
(Continued)

(56) References Cited

U.S. PATENT DOCUMENTS 6,483,295 B2  11/2002  Irle et al.
11,137,267 B2  10/2021  Utermoehlen et al.
(Continued)

FOREIGN PATENT DOCUMENTS

DE     10026019 A1   11/2001
DE   102016202877 B3    6/2017
(Continued)

OTHER PUBLICATIONS

International Search Report dated Jul. 16, 2021 in corresponding application PCT/EP2021/063902.

*Primary Examiner* — Raul J Rios Russo
(74) *Attorney, Agent, or Firm* — Muncy, Geissler, Olds & Lowe, P.C.

(57) ABSTRACT

An inductive position sensor including a stator element having an exciter coil to which a periodic alternating voltage is applied and having a receiving system, wherein the signal of the exciter coil is inductively coupled into the receiving system. A rotor element influences the strength of the inductive coupling between the exciter coil and the receiving system according to its angular position relative to the stator element. An evaluation circuit determines the angular position of the rotor element relative to the stator element from the voltage signals induced in the receiving system. The position sensor has an unambiguous range E, in which the angular position can be unambiguously determined. The receiving system extends over a first angular range, wherein the first angular range is $N_1=n*E$ where $n \geq 1$, and the exciter coil extends over a second angular range, wherein the second angular range is $N_2=m*E$ where $m \geq 2$.

10 Claims, 2 Drawing Sheets

(58) Field of Classification Search
USPC .................................................. 324/207.17
See application file for complete search history.

(56) References Cited

U.S. PATENT DOCUMENTS

| | | | |
|---|---|---|---|
| 11,525,702 B2 | 12/2022 | Oshinubi et al. | |
| 2002/0043972 A1* | 4/2002 | Irle ........................ | G01D 5/204 |
| | | | 324/207.17 |
| 2007/0001666 A1* | 1/2007 | Lee ...................... | G01D 5/2053 |
| | | | 324/207.16 |
| 2009/0021245 A1* | 1/2009 | Lee ...................... | G01D 5/2053 |
| | | | 324/207.16 |
| 2019/0017845 A1 | 1/2019 | Utermoehlen et al. | |
| 2019/0195963 A1 | 7/2019 | Qama | |
| 2020/0132874 A1 | 4/2020 | Witts et al. | |
| 2021/0063206 A1* | 3/2021 | Ausserlechner ......... | G01B 7/30 |
| 2022/0282997 A1* | 9/2022 | Meisenberg ............. | G01B 7/30 |
| 2023/0098140 A1* | 3/2023 | Nordhorn .......... | H02K 11/0094 |
| | | | 310/66 |

FOREIGN PATENT DOCUMENTS

| | | |
|---|---|---|
| DE | 102017211190 A1 | 1/2019 |
| JP | 2009192546 A | 8/2009 |

* cited by examiner

INDUCTIVE POSITION SENSOR

This nonprovisional application is a continuation of International Application No. PCT/EP2021/063902, which was filed on May 25, 2021, and which claims priority to German Patent Application No. 10 2020 114 861.5, which was filed in Germany on Jun. 4, 2021, and which are both herein incorporated by reference.

BACKGROUND OF THE INVENTION

Field of the Invention

The present invention relates to an inductive position sensor, in particular a segment sensor, comprising a stator element having an exciter coil to which a periodic alternating voltage is applied and having a receiving system, wherein the signal of the exciter coil is inductively coupled into the receiving system, comprising a rotor element which influences the strength of the inductive coupling between the exciter coil and the receiving system according to its angular position relative to the stator element, and comprising an evaluation circuit for determining the angular position of the rotor element relative to the stator element from the voltage signals induced in the receiving system.

Description of the Background Art

Inductive position sensors are used in modern motor vehicles in a wide range of applications with a variety of boundary conditions. In particular, inductive position sensors are used where an angular position of a rotor is to be detected in order to enable precise control. This can be necessary, for example, on a steering column, in a braking system, or in a drive system for motor vehicles, especially electric and hybrid vehicles.

Known inductive position sensors usually use systems that can detect a certain angular range. This is sufficient for most fields of applications. By limiting the angle detection to a certain range, costs can be saved compared to an angle detection over the entire possible angular range, for example, 360° in the case of a fully rotary sensor. These position sensors are known as segment sensors from the state of the art. In the design of these position sensors, the size of the exciter coil has often been designed to be similar in size to the receiving system in order to achieve the smallest possible structural form of the inductive position sensor. Particularly in the case of segment and linear sensors, this can lead to a disruptive effect of the exciter coil on the voltage signals induced in the receiving system and impair the angle determination. If the influence of the exciter coil is to be as small as possible, this means that the exciter coil had to be as large as possible relative to the receiving system. In the design of position sensors, attempts have so far been made in a plurality of design steps to achieve an optimum between minimizing the size of the position sensor and minimizing the influence of the exciter coil on the receiving system. These design steps cost time and development effort and increase costs. Likewise, the iterative design steps do not automatically ensure that an optimum solution has been found.

This is the starting point for the invention.

SUMMARY OF THE INVENTION

It is therefore an object of the present invention to improve known position sensors, in particular segment sensors, so that the error in determining the angle is minimized and at the same time the smallest possible overall size can be realized.

According to the invention, the object is achieved in that the position sensor has an unambiguous range E in which the angular position can be unambiguously determined, the receiving system extends over a first angular range, wherein the first angular range is $N_1 = n*E$ where $n \geq 1$ and the exciter coil extends over a second angular range, wherein the second angular range is $N_2 = m*E$ where $m \geq 2$, wherein m and n are positive whole numbers and $m \geq n$.

The unambiguous range can be understood to be the range in which an angle can be unambiguously determined by means of the position sensor. This unambiguous range can be between 0° and 360°. Because position sensors are used in a wide variety of locations, the unambiguous range that the sensor must unambiguously detect can vary greatly. However, the unambiguous range is and will be specified by the boundary conditions of the system and can be used as an input variable in designing the position sensor.

In the inductive position sensor of the invention, it is possible that the influence of the exciter coil on the voltage signals induced in the receiving system can be minimized if the angular range over which the exciter coil and the receiving system extend is designed according to the unambiguous range.

It could be shown by means of simulation that a minimization of the error in determining the angle can be achieved if the receiving system extends over a first angular range and the exciter coil extends over a second angular range, which are realized as multiples of the unambiguous range. It applies here that the multiples are positive whole numbers, and the second angular range is greater than the first angular range.

It can be provided that $m \geq n+1$, preferably $m = n+1$. To achieve minimization of the error, the second angular range can be any multiple of the unambiguous range that is greater than the first angular range. However, this would be contrary to the desire that a most compact possible structural form of the position sensor is to be realized. It is therefore preferably a possibility that the second angular range is a multiple of the unambiguous range, which is exactly greater by 1 than the multiple with which the first angular range is designed. Accordingly, the smallest angular ranges that satisfy these requirements are when the first angular range matches the unambiguous range, and this corresponds to $n=1$ and the second angular range corresponds to twice the unambiguous range with $m=2$.

If a higher signal strength of the signal coupled into the receiving system is desired, it can be provided that the first angular range is designed with $n=2$. In this case, the strength of the inductive coupling between the exciter coil and the receiving system is influenced by a larger area of the rotor element, which increases the influence. The smallest possible second angular range in this case would be that $m=3$ is selected.

It can be provided that the geometry of the rotor element can be described by two circular paths with different radii around a center point, wherein a first radius of a first of the two circular paths is smaller than a second radius of a second of the two circular paths, and a section of an outer contour extends alternately and uniformly on the first or the second circular path, and the ends of the sections are connected by a radial connection between the circular paths to the respective adjacent sections on the respective other circular path.

The resulting geometry of the rotor element corresponds to the outer contour of a rotor with a number of blades and gaps. It can therefore be provided that in each case the section on the circular path with the second radius forms a blade and in each case the section on the circular path with the first radius forms a gap. The geometry of the rotor element can be used to determine the unambiguous range of the position sensor. There is the possibility that the unambiguous range E can be determined according to the formula:

$$E = 360°/\text{Number of blades of the rotor element.}$$

In many cases, the number of rotor element blades is a fixed quantity due to other circumstances and is to be regarded as known for the design of the position sensor. The unambiguous range can be determined directly by the given relation between the number of blades of the rotor element and the unambiguous range, if the number of blades is known.

It is possible for the first receiving system to have at least two, preferably two or three, first conductor loops. Furthermore, it can be provided that the first conductor loops each form a uniformly repeating loop structure. Particularly advantageously, it can be provided that the winding direction of the first conductor loops of the uniformly repeating loop structure changes, wherein an area is spanned by the change of the winding direction. Changing the winding direction changes the integration path of the areas periodically spanned by the first conductor loops. The magnetic field coupled into the first receiving system by the first rotor element results in a signal voltage amplitude at the conductor loop that is proportional to the expression $\int B_r dA$, where $B_r$ is the magnetic field strength caused by the rotor element in the first conductor loop and A is the area spanned by the first conductor loop.

It can be provided that the stator element and the evaluation circuit are arranged on a printed circuit board, wherein the evaluation circuit is arranged inside the exciter coil and outside the conductor loops of the receiving system. An arrangement as described offers the advantage that the supply lines of the exciter coil and the receiving system do not cross, as would be the case if the evaluation unit were arranged outside the exciter coil. This avoids a further influence on the signal coupled into the receiving system. A further advantage can be that unused space on the circuit board is utilized, which contributes to a compact structural form of the inductive position sensor.

To increase the redundancy of the system, it can be provided that a second receiving system and/or a second evaluation circuit are arranged on the circuit board. It can be provided that the signal from the exciter coil is inductively coupled into the first and second receiving systems. Likewise, there is the possibility that a second exciter coil is arranged on the circuit board.

The problem underlying the invention and its solution according to the invention have been explained so far using the example of a segment sensor with a rotor element as an inductive coupling element. However, the problem and the solution are completely analogous for the linear position sensor. Linear sensors are used in modern motor vehicles where a length position of a coupling element is to be detected in order to enable precise control.

It can be provided that the inductive position sensor is in particular a linear sensor, comprising a stator element having an exciter coil to which a periodic alternating voltage is applied and having a receiving system, wherein the signal of the exciter coil is inductively coupled into the receiving system, comprising a coupling element which influences the strength of the inductive coupling between the exciter coil and the receiving system according to its linear position relative to the stator element, and comprising an evaluation circuit for determining the linear position of the coupling element relative to the stator element from the voltage signals induced in the receiving system, characterized in that the position sensor has an unambiguous range E in which the length position can be unambiguously determined, the receiving system extends over a first length range, wherein the first length range is $L_1 = n*E$ where $n \geq 1$, and the exciter coil extends over a second length range, wherein the second length range is $L_2 = m*E$ where $m \geq 2$, wherein m and n are positive whole numbers and $m > n$.

The unambiguous range can be understood to be the range in which a length position can be unambiguously determined by means of the position sensor. This unambiguous range can theoretically be between 0 mm and ∞, but is inherently limited by the dimensions of the linear sensor. Because position sensors are used in a wide variety of locations, the unambiguous range that the sensor must unambiguously detect can vary greatly. However, the unambiguous range is and will be specified by the boundary conditions of the system and can be used as an input variable in designing the position sensor.

In the inductive position sensor of the invention, it is possible that the influence of the exciter coil on the voltage signals induced in the receiving system can be minimized if the length range over which the exciter coil and the receiving system extend is designed according to the unambiguous range.

Analogous to the simulation results, it is believed that minimization of the error in determining the length position can be achieved if the receiving system extends over a first length range and the exciter coil extends over a second length range, which are realized as multiples of the unambiguous range. It applies here that the multiples are positive whole numbers, and the second length range is greater than the first length range.

It can be provided that $m \geq n+1$, preferably $m = n+1$. To achieve minimization of the error, the second length range can be any multiple of the unambiguous range that is greater than the first length range. However, this would be contrary to the desire that the most compact possible structural form of the position sensor is to be realized. It is therefore preferably a possibility that the second length range is a multiple of the unambiguous range, which is exactly greater by 1 than the multiple with which the first length range is designed. Accordingly, the smallest length ranges that satisfy these requirements are when the first length range matches the unambiguous range, and this corresponds to $n=1$ and the second length range corresponds to twice the unambiguous range with $m=2$.

If a higher signal strength of the signal coupled into the receiving system is desired, it can be provided that the first length range is designed with $n=2$. In this case, the strength of the inductive coupling between the exciter coil and the receiving system is influenced by a larger area of the coupling element, which increases the influence. The smallest possible second length range in this case would be that $m=3$ is selected.

It can be provided that the shape of the coupling element is rectangularly contoured or rectangular, for example, a metal strip with regularly distributed punched-out areas. The areas of the metal strip that remain filled with material can be referred to as cursors, similar to the blades on a rotor-shaped coupler element.

The unambiguous range of the position sensor can be determined by means of the resulting geometry of the coupling element. In this case, the possibility exists that the unambiguous range E is determinable as the sum of one of the regularly distributed punched-out areas and a cursor.

It is possible for the first receiving system to have at least two, preferably two or three, first conductor loops. Furthermore, it can be provided that the first conductor loops each form a uniformly repeating loop structure. Particularly advantageously, it can be provided that the winding direction of the first conductor loops of the uniformly repeating loop structure changes, wherein an area is spanned by the change of the winding direction. Changing the winding direction changes the integration path of the areas periodically spanned by the first conductor loops. The magnetic field coupled into the first receiving system by the first coupling element results in a signal voltage amplitude at the conductor loop that is proportional to the expression $\int B_l dA$, where $B_l$ is the magnetic field strength caused by the coupling element in the first conductor loop and A is the area spanned by the first conductor loop.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
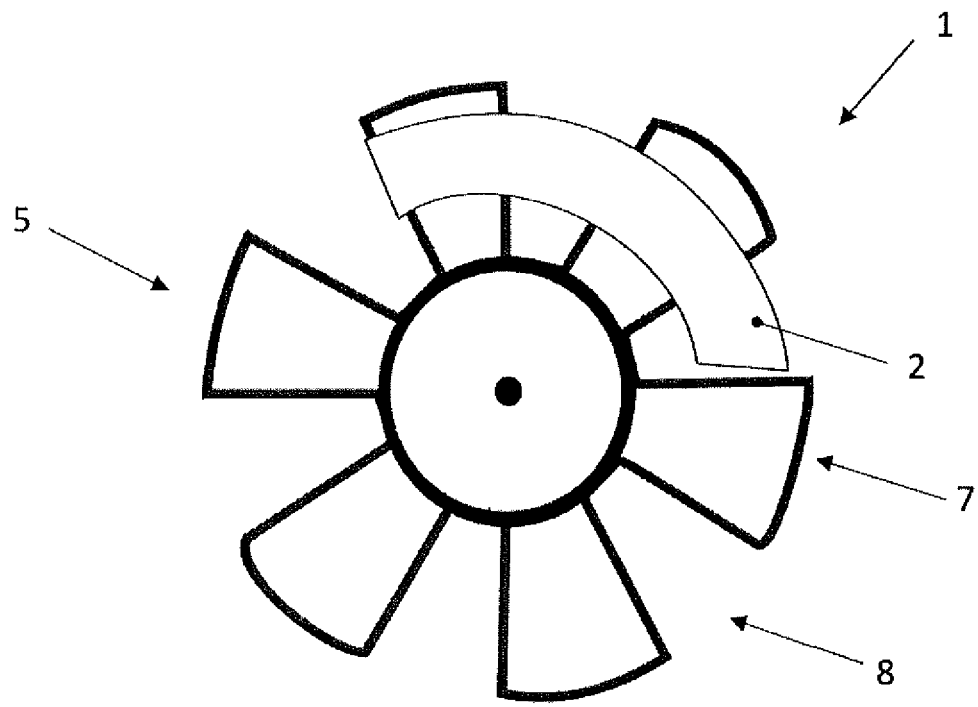
FIG. 1 shows a schematic representation of an inductive position sensor.

An inductive position sensor 1 constructed according to a preferred exemplary embodiment of the present invention comprises a circuit board 9 on which a stator element 2 is disposed.

Furthermore, inductive position sensor 1 comprises a rotor element 5. Rotor element 5 is arranged to rotate relative to circuit board 9. The sections can be seen on the outer radius of rotor element 5. These can be assumed to be blades 7. The sections at the inner radius of rotor element 5 can be assumed to be gaps 8. Here, a blade 8 and a gap 9 respectively define the unambiguous range E of position sensor 1. The unambiguous range E is understood to be the range in which an angle can be unambiguously determined by means of position sensor 1. The unambiguous range of the position sensor can be calculated according to the formula $E = 360°$/Number of blades of the rotor element 5.

Figure 2:
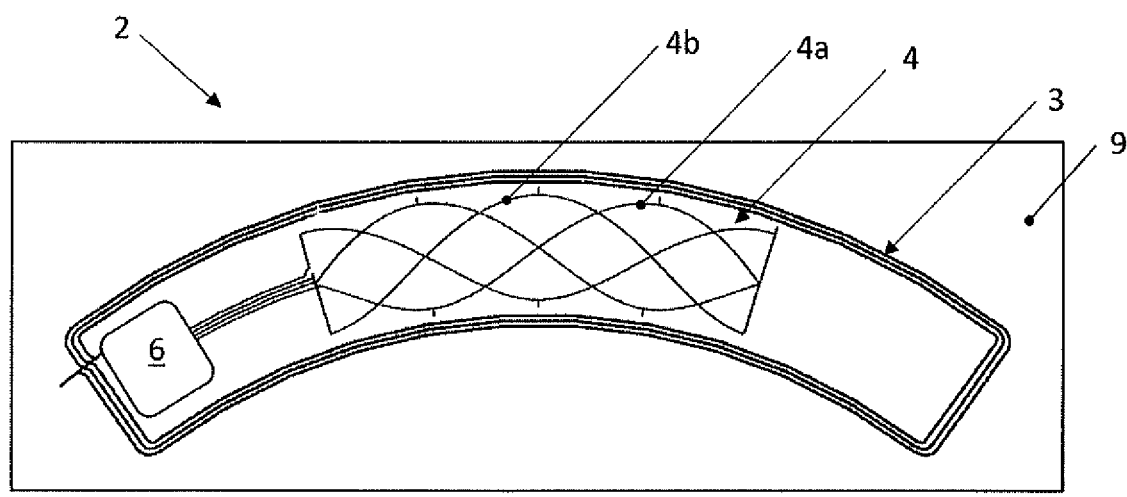
FIG. 2 shows a schematic representation of a stator element.

FIG. 2 shows an enlarged detail of stator element 2 from FIG. 1. The stator element, which comprises an exciter coil 3 and a receiving system 4, is arranged on the side of circuit board 9 facing rotor element 5. Circuit board 9 is adapted in its actual design to the shape of stator element 2. Receiving system 4 comprises two first conductor loops 4a, 4b. First conductor loops 4a, 4b form a periodically repeating loop structure, which span an area by a change in the winding direction.

Inductive position sensor 1 has an oscillator circuit, which during operation of inductive position sensor 1 generates a periodic alternating voltage signal, with which first exciter coil 3 is supplied. In its rotation, rotor element 5 affects the strength of the inductive coupling between exciter coil 3 and receiving system 4.

By influencing the strength of the inductive coupling between exciter coil 3 and receiving system 4 by rotor element 5 according to its angular position relative to stator element 2, the angle between rotor element 5 and receiving system 4 can be determined. This angle is increasingly important for many applications, especially in a motor vehicle. In order to be able to determine the angle within the unambiguous range E of the sensor, exciter coil 3 and receiving system 4 must extend at least over this angular range of sensor 1. The signals coupled into receiving system 4 are influenced by exciter coil 3 due to the end regions of exciter coil 3. This influence is undesirable, because it can lead to an error in determining the angle. FIG. 2 shows one way of optimally designing the relation between exciter coil 3 and receiving system 4 and minimizing the error. For this purpose, it is possible that both exciter coil 3 and receiving system 4 are larger by a whole number multiple than the unambiguous range E. It applies to receiving system 4 that the multiple can also be 1, which would make receiving system 4 as large as the unambiguous range E. Furthermore, it is a prerequisite that exciter coil 3 must always be larger than receiving system 4. In the present case, the angular range over which receiving system 4 extends corresponds to the unambiguous range E and the angular range over which exciter coil 3 extends is larger by a factor of 2.

Inductive position sensor 1 further has an evaluation circuit 6 for determining the angular position of rotor element 5 relative to stator element 2 from the signals coupled into receiving system 4. Evaluation circuit 6 is arranged inside exciter coil 3 and outside conductor loops 4a, 4b of receiving system 4. Such an arrangement offers the advantage that unused space on circuit board 9 can be used optimally. If evaluation circuit 6 is located outside exciter coil 3, the required size of circuit board 9 is larger, which increases its cost.

Figure 3:
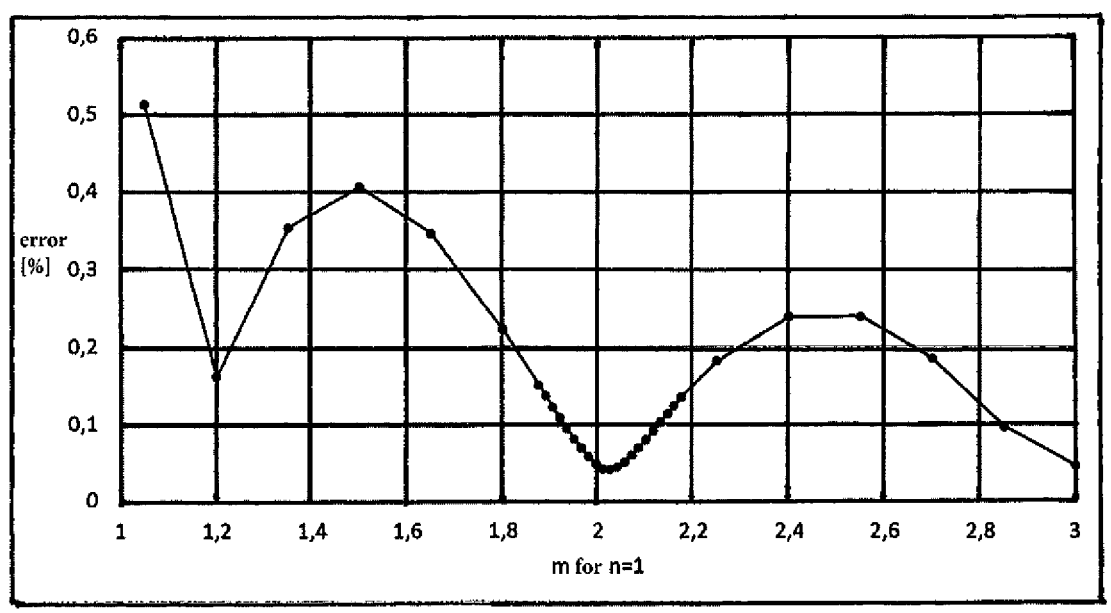
FIG. 3 shows a graphical representation of the error in determining the angle for different relations of the receiving system to the exciter coil.

FIG. 3 shows a graphical representation of the expected error in determining the angle due to the influence of exciter coil 3 on the signals coupled into receiving system 4, for different sizes of exciter coil 3. The percentage error of the sensor is plotted here versus the determined angle of the inductive position sensor. In this case, receiving system 4 is as large as the unambiguous range E of the sensor. The illustration shows a simulation of the expected error. It can be seen that the error becomes minimal for whole number values of m. The graph shows the minima for m=2 and m=3. It is possible to continue the graph showing a minimum for all whole number m. It follows from the graph that the error in determining the angle due to the influence of exciter coil 3 on the signal coupled into receiving system 4 can be minimized by the design of exciter coil 3 and receiving system 4 in relation to the unambiguous range E of the sensor. What is particularly advantageous about this mathematical relationship is the fact that if the unambiguous range E of the sensor is known, which is determined by the geometry of rotor element 5, the design of exciter coil 3 and receiving system 4 can be carried out immediately. This can reduce development effort and ensure optimal results.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An inductive position sensor comprising:
a stator element having an exciter coil to which a periodic alternating voltage is applied and having a receiving system, a signal of the exciter coil being inductively coupled into the receiving system;
a rotor element that influences a strength of the inductive coupling between the exciter coil and the receiving system according to an angular position of the rotor element relative to the stator element; and
an evaluation circuit to determine the angular position of the rotor element relative to the stator element from voltage signals induced in the receiving system,
wherein the inductive position sensor has an unambiguous range E, in which the angular position is unambiguously determined,
wherein the receiving system extends over a first angular range,
wherein the first angular range is $N_1=n*E$ where $n\geq 1$,
wherein the exciter coil extends over a second angular range,
wherein the second angular range is $N_2=m*E$ where $m\geq 2$,
wherein m and n are positive whole numbers and m>n, and
wherein the unambiguous range E is determined according to the formula:

$$E=360°/\text{Number of blades of the rotor element}.$$

2. The inductive position sensor according to claim 1, wherein $m\geq n+1$, or wherein $m=n+1$.

3. The inductive position sensor according to claim 1, wherein the geometry of the rotor element is described by two circular paths with different radii around a center point, wherein a first radius of a first of the two circular paths is smaller than a second radius of a second of the two circular paths, and a section of an outer contour extends alternately and uniformly on the first or the second circular path, and the ends of the sections are connected by a radial connection between the circular paths to the respective adjacent sections on the respective other circular path.

4. The inductive position sensor according to claim 3, wherein the section on the circular path with the second radius forms a blade and the section on the circular path with the first radius forms a gap.

5. The inductive position sensor according to claim 1, wherein the receiving system has at least two or three first conductor loops.

6. The inductive position sensor according to claim 5, wherein the first conductor loops each form a uniformly repeating loop structure.

7. The inductive position sensor according to claim 6, wherein a winding direction of the first conductor loops of the uniformly repeating loop structure changes, wherein an area is spanned by the change of the winding direction.

8. The inductive position sensor according to claim 5, wherein the stator element and the evaluation circuit are arranged on a printed circuit board, wherein the evaluation circuit is arranged inside the exciter coil and outside the first conductor loops of the receiving system.

9. An inductive position sensor comprising:
a stator element having an exciter coil to which a periodic alternating voltage is applied and having a receiving system, a signal of the exciter coil being inductively coupled into the receiving system;
a coupling element that influences the strength of the inductive coupling between the exciter coil and the receiving system according to a linear position of the coupling element relative to the stator element; and
an evaluation circuit to determine the linear position of the coupling element relative to the stator element from voltage signals induced in the receiving system,
wherein the inductive position sensor has an unambiguous range E in which the linear position is unambiguously determined,
wherein the receiving system extends over a first length range,
wherein the first length range is $L_1=n*E$ where $n\geq 1$,
wherein the exciter coil extends over a second length range,
wherein the second length range is $L_2=m*E$ where $m\geq 2$,
wherein m and n are positive whole numbers and m>n, and
wherein the inductive position sensor is a linear sensor.

10. The inductive position sensor according to claim 1, wherein the inductive position sensor is a segment sensor.

* * * * *